United States Patent

Nandi et al.

(10) Patent No.: US 10,131,782 B2
(45) Date of Patent: Nov. 20, 2018

(54) POLYOXYMETHYLENE COMPOSITIONS, METHOD OF MANUFACTURE, AND ARTICLES MADE THEREFROM

(71) Applicant: SABIC GLOBAL TECHNOLOGIES B.V., Bergen op Zoom (NL)

(72) Inventors: Sangita Nandi, Bangalore (IN); Susanta Mitra, Bangalore (IN); Jelena Bozovic-Vukic, Eindhoven (NL); Abdulsattar Dawood, Riyadh (IN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 15/505,421

(22) PCT Filed: Sep. 3, 2015

(86) PCT No.: PCT/EP2015/070133
§ 371 (c)(1),
(2) Date: Feb. 21, 2017

(87) PCT Pub. No.: WO2016/034668
PCT Pub. Date: Mar. 10, 2016

(65) Prior Publication Data
US 2017/0267858 A1 Sep. 21, 2017

Related U.S. Application Data

(60) Provisional application No. 62/046,238, filed on Sep. 5, 2014.

(51) Int. Cl.
| | |
|---|---|
| C08K 7/14 | (2006.01) |
| C08K 3/40 | (2006.01) |
| C08L 59/02 | (2006.01) |
| C08L 59/04 | (2006.01) |
| C08L 33/12 | (2006.01) |
| C08K 5/00 | (2006.01) |
| C08L 33/00 | (2006.01) |
| C08L 51/04 | (2006.01) |

(52) U.S. Cl.
CPC .............. *C08L 59/02* (2013.01); *C08K 5/005* (2013.01); *C08K 7/14* (2013.01); *C08L 33/00* (2013.01); *C08L 33/12* (2013.01); *C08L 51/04* (2013.01); *C08L 59/04* (2013.01); *C08K 3/40* (2013.01); *C08L 2201/00* (2013.01); *C08L 2201/08* (2013.01)

(58) Field of Classification Search
None
See application file for complete search history.

(56) References Cited

U.S. PATENT DOCUMENTS

| | | |
|---|---|---|
| 3,647,743 A | 3/1972 | Nagamatsu et al. |
| 4,427,807 A | 1/1984 | Zimmerman et al. |
| 4,506,053 A | 3/1985 | Sakurai et al. |
| 4,533,680 A | 8/1985 | Kasuga et al. |
| 4,639,488 A | 1/1987 | Schuette et al. |
| 4,808,689 A | 2/1989 | Katz |
| 5,286,807 A | 2/1994 | Flexman, Jr. |
| 7,618,714 B2 | 11/2009 | Ziegler et al. |
| 8,053,499 B2 | 11/2011 | Disch et al. |
| 8,092,919 B2 | 1/2012 | Lee et al. |
| 8,188,169 B2 | 5/2012 | Moraczewski et al. |
| 8,236,430 B2 | 7/2012 | Ziegler et al. |
| 2003/0125512 A1* | 7/2003 | Nakamura ............... C08G 2/18 528/425 |
| 2005/0107513 A1* | 5/2005 | Papke ...................... C08K 7/14 524/494 |
| 2009/0048388 A1* | 2/2009 | Elia ......................... C08K 7/06 524/502 |
| 2010/0056698 A1* | 3/2010 | Shinohara ............... C08L 59/00 524/521 |
| 2011/0028609 A1 | 2/2011 | Lawson |
| 2013/0137811 A1 | 5/2013 | Fan et al. |

FOREIGN PATENT DOCUMENTS

| | | |
|---|---|---|
| CN | 102719052 A | 10/2012 |
| CN | 103131166 A | 6/2013 |
| CN | 103387709 A | 11/2013 |
| DE | 10209756 A1 | 9/2003 |
| EP | 0201691 A2 | 11/1986 |
| EP | 1560707 B1 | 11/2003 |
| GB | 1495322 | 12/1977 |
| WO | 2012049293 A1 | 4/2012 |

OTHER PUBLICATIONS

International Search Report and Written Opinion of the International Searching Authority for PCT/EP2015/070133 dated Nov. 18, 20015, 11 pages.

* cited by examiner

*Primary Examiner* — Richard A Huhn
(74) *Attorney, Agent, or Firm* — Cantor Colburn LLP

(57) ABSTRACT

Reinforced polyoxymethylene compositions including 50 to 90 wt. % of a polyoxymethylene; 10 to 50 wt. % of glass fibers, wherein the weight of the polyoxymethylene and the glass fibers total 100 wt. %; 1 to less than 4.0 wt. % of a (meth)acrylic polymer additive, based on the total weight of the polyoxymethylene and the glass fibers; 0.1 to 5 wt. %, preferably 0.1 to 2.5 wt. % of a heat stabilizer; and 0.1 to 5 wt. % of an antioxidant, wherein the amounts of the (meth) acrylic polymer additive, the heat stabilizer, and the antioxidant are based on the total weight of the polyoxymethylene and the glass fibers.

19 Claims, No Drawings

POLYOXYMETHYLENE COMPOSITIONS, METHOD OF MANUFACTURE, AND ARTICLES MADE THEREFROM

BACKGROUND

Polyoxymethylenes (POM), also known as polyacetals, are well established as exceptionally useful engineering materials in a variety of applications. Polyoxymethylenes generally exhibit excellent mechanical properties, fatigue resistance, abrasion resistance, chemical resistance, lubricity, and moldability. Compositions comprising polyoxymethylene are particularly useful in preparing articles by extrusion, compression molding, injection molding, blow molding, rotational molding, melt spinning, stamping, and thermoforming techniques commonly used with thermoplastic materials. Finished articles made from such compositions possess the aforementioned desirable properties associated with polyoxymethylenes, and accordingly find utility in constructing molded parts across a broad range of technologies, for example, in automotive, industrial/machinery, consumer goods and electrical/electronic applications.

In many applications, it is often important that the polyoxymethylene compositions have good mechanical properties including toughness and stiffness, especially when exposed to heat. Unreinforced polyoxymethylene compositions often have good elongations at yield and wear resistance, but can have insufficient stiffness, particularly at elevated temperatures. Additives such as mineral fillers and fibrous reinforcing agents are often used to improve the physical properties of polymeric compositions. When reinforcing agents are incorporated in polyoxymethylene compositions, increased impact strength can come at the expense of other material properties including, for example, wear resistance and ductility. It would therefore be desirable to provide polyoxymethylene compositions having balanced physical properties. Of particular interest are polyoxymethylene compositions having high impact strength without causing a significant reduction in other properties, which has heretofore not been possible with conventional polyoxymethylene compositions.

Optimizing modulus-impact balance refers to a composition having a property profile where the impact strength is increased significantly with minimal or no effect on modulus. Furthermore, other enabling properties of polyoxymethylene compositions, including thermal properties, are not expected to be affected in a modulus-impact balanced composition. Polyoxymethylene composite materials having these desired properties have been the subject of intensive research and development. Optimizing mechanical and thermal properties has largely been focused on tuning interfacial interactions between polymer matrix and filler components by, for example, sizing the fillers, functionalizing the polymer matrices, and compatibilizing the composites through additives or copolymers.

Nonetheless, there remains a continuing need for reinforced polyoxymethylene compositions having high impact strength in addition to good overall mechanical properties and thermal stability.

BRIEF DESCRIPTION

As disclosed herein, a polyoxymethylene composition comprises 50 to 90 wt % of a polyoxymethylene; 10 to 50 wt % of glass fibers, wherein the weight of the polyoxymethylene and the glass fibers total 100 wt. %; and 1 to less than 4.0 wt % of a (meth)acrylic polymer additive, based on the total weight of the polyoxymethylene and the glass fibers.

A method of manufacturing the polyoxymethylene composition comprises melt-combining the components of the composition, and extruding the components.

An article comprises the polyoxymethylene composition. The article can be an automobile component, a textile machinery component, or an engineering component.

A molded sample of a polyoxymethylene composition comprises glass fibers and 1 to less than 4 wt. % of a (meth)acrylic polymer additive, the molded sample having an average tensile modulus of 8.5 GPa or greater and an average tensile strength of 130 MPa or greater, such as 130 GPa or greater, measured according to ISO 527/2012.

The above described and other features are exemplified by the Detailed Description.

DETAILED DESCRIPTION

Described herein are polyoxymethylene compositions having high impact strength without affecting modulus (stiffness) and thermal properties (heat deflection temperature). The compositions comprise a polyoxymethylene, reinforcing glass fibers, and a (meth)acrylic polymer additive. It was unexpectedly discovered that the use of certain (meth)acrylic polymer additives in specified quantities can impart the reinforced polyoxymethylene compositions with improved impact strength, while maintaining balanced mechanical and thermal properties. Tribological properties of the compositions are also improved in the presence of the (meth)acrylic polymer additives.

Polyoxymethylene, as used herein, includes homopolymers, copolymers, or a combination of these. The polyoxymethylenes comprise oxymethylene structural repeat units (—CH$_2$O—) as the main constituent unit.

Polyoxymethylene homopolymers can be prepared by polymerizing formaldehyde or formaldehyde equivalents, such as cyclic oligomers of formaldehyde. In an exemplary embodiment, polyoxymethylene homopolymers can have terminal hydroxyl groups that can be capped to form, for example, ester or other groups. Additional end groups for homopolymers can include, but are not limited to, acetate and methoxy groups.

Polyoxymethylene copolymers can contain one or more units derived from co-monomers, which can include acetals and cyclic ethers that lead to the incorporation of ether units with 2 to 12 sequential carbon atoms into the polymer chain. When the compositions include a polyoxymethylene copolymer, the quantity of co-monomer is generally no more than 20 weight percent, for example, not more than 15 weight percent, for example, about 2 weight percent. Exemplary co-monomers include ethylene oxide, butylene oxide, and 1,3-dioxolane. The polyoxymethylene copolymer is ordinarily a random copolymer but can be a block copolymer, a graft copolymer, or the like. The copolymer can be stabilized at the chain-end by, for example, esterification with a carboxylic acid (e.g., acetic acid, propionic acid, or butyric acid).

The polyoxymethylenes can be obtained by cationic polymerization through the addition of an adequate amount of molecular weight adjustor and through the use of a cationic polymerization catalyst. Applicable molecular weight adjustor, cationic polymerization catalyst, polymerization method, polymerization apparatus, deactivation of catalysts after polymerization, method for stabilizing terminals of crude polyoxymethylene copolymers prepared by the polymerization, and the like are generally known, and any of them can be used to prepare the polyoxymethylenes of the present disclosure.

The polyoxymethylenes can be branched or linear and generally can have a number average molecular weight (Mn) of at least 10,000 grams/mole, for example, 20,000 to 90,000 grams/mole. The molecular weight can be measured: 1) by gel permeation chromatography in m-cresol at 160° C. using a DuPont PSM bimodal column kit with nominal pore size of 60 and 1000 angstrom; or 2) by determining the melt flow using ASTM D1238 or ISO 1133. The melt flow can be 0.1 to 100 grams per minute (g/min), or 0.5 to 60 g/min, or more specifically 0.8 to 40 g/min. There is no particular restriction as to the polymerization degree or molecular weight of the polyoxymethylenes, as long as the polymers possess the desired melt moldability. The amount of polyoxymethylene present in the composition can be 50 to 90 weight percent (wt. %), for example, 60 to 85 wt. %, for example, 70 to 80 wt. % based on 100 wt. % of polyoxymethylene and reinforcing agent.

Polyoxymethylenes manufactured and purified as described herein are suitable for use in a wide variety of compositions and applications. Additives can be added to the purified polyoxymethylene to form a polyoxymethylene composition. The additives can include one or more additives selected to achieve a desired property, with the proviso that the additive(s) are also selected so as to not significantly adversely affect a preferred property of the polyoxymethylene composition.

The polyoxymethylene compositions of the present disclosure further comprise a reinforcing agent. Suitable reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (for example, chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well as combinations comprising at least one of the foregoing reinforcing agents. The reinforcing agents can be coated with a layer of metallic material to facilitate conductivity, or surface treated with silanes to improve adhesion and dispersion with the polymer matrix. The reinforcing agent may for example be glass fibers.

The reinforcing agent can be, for example, chopped glass fibers. Useful glass fibers can be formed from any type of known fiberizable glass composition, and include, for example, those prepared from fiberizable glass compositions commonly known as "E-glass," "A-glass," "C-glass," "D-glass," "R-glass," "S-glass," as well as E-glass derivatives that are fluorine-free and/or boron-free. Commercially produced glass fibers generally have nominal filament diameters of 4.0 to 35.0 micrometers, and most commonly produced E-glass fibers have a nominal filament diameter of 9.0 to 30.0 micrometers. The filaments can be made by standard processes, for example, by steam or air blowing, flame blowing and mechanical pulling. The filaments for polymer reinforcement can be made by mechanical pulling. A fiber having a non-round cross section can also be used. The glass fibers can be sized or unsized.

The reinforcing agent in the composition can be present in an amount of 10 to 50 weight percent (wt. %), or 15 to 40 wt. %, or 20 to 30 wt. %, based on 100 wt. % of polyoxymethylene and reinforcing agent.

The glass fibers in the composition can be present in an amount of 10 to 50 weight percent (wt. %), or 15 to 40 wt. %, or 20 to 30 wt. %, based on 100 wt. % of polyoxymethylene and reinforcing agent.

The polyoxymethylene compositions of the present disclosure further comprise a (meth)acrylic polymer additive. (Meth)acrylic polymer additives, when used in the prescribed amounts, have been surprisingly found to impart high impact strength without adversely affecting other mechanical and thermal properties associated with the polyoxymethylene composition. The (meth)acrylic polymer additive can be derived from one or more alkyl (meth)acrylate monomers. Useful alkyl methacrylates can have 1 to 4 carbon atoms in the alkyl group, for example, methyl methacrylate, ethyl methacrylate, propyl methacrylate, isopropyl methacrylate, t-butyl methacrylate and isobutyl methacrylate. In one embodiment, the (meth)acrylic polymer additive can be derived from methyl methacrylate, for example, the additive can be poly(methyl methacrylate).

The (meth)acrylic polymer additive can alternatively be a core-shell (meth)acrylic polymer. The term "core-shell polymer" as used herein refers to polymer particles having a core of a first polymer surrounded by one or more shells, or layers, of polymer, each shell polymer being different from any adjacent shell or core polymer, the particles being formed by multi-stage polymerization, such that the shell or shells are covalently bonded to the core and/or adjacent shells. Useful core-shell polymers can comprise a (meth)acrylic shell and an elastomer core. The elastomer core can be, for example, an acrylic core, a silicone core, a styrene core, or a butadiene-styrene core. For example, the core-shell (meth)acrylic polymer additive can have an acrylic core and an acrylic shell sold as METABLEN W-341 from Mitsubishi Rayon, Japan. The core-shell (meth)acrylic polymer additive can have an acrylic core and a silicone shell sold as METABLEN SRK200 from Mitsubishi Rayon, Japan. The core-shell (meth)acrylic polymer additive can have a methacrylate shell and a styrene core sold as Paraloid™ EXL-2330 from Dow Chemicals, USA. The core-shell (meth)acrylic polymer additive can have a methacrylate shell and a butadiene-styrene core sold as Clearstrength® E920 from Arkema, Ind. The (meth)acrylic polymer additive can be a combination comprising at least one of the aforementioned (meth)acrylic polymer additives. For example, the (meth)acrylic polymer additive can be a combination of one or more (meth)acrylic polymers derived from one or more alkyl (meth)acrylates. For example, the (meth)acrylic polymer additive can be a combination of one or more (meth)acrylic polymers derived from one or more alkyl (meth)acrylates and one or more core-shell (meth) acrylic polymer additives. For example, the (meth)acrylic polymer additive can be a combination of one or more core-shell (meth)acrylic polymer additives.

The (meth)acrylic polymer additive can be present in an amount of 1 to less than 4.0 weight percent (wt. %), such as 1.0 to less than 4.0 wt %, or 1 to 3.9 wt %, or 1.0 to 3.9 wt %, or 1.5 to 3.5 wt. %, or 2 to 3 wt. %, based on 100 wt. % of polyoxymethylene and reinforcing agent.

The polyoxymethylene composition of the present disclosure further comprises a heat stabilizer. The heat stabilizer can be a nitrogen-containing compound. Nitrogen-containing additives are selected primarily to reduce formaldehyde emissions from the composition by reacting and binding released formaldehyde, for example, as "formaldehyde scavengers." Any suitable nitrogen-containing compound can be incorporated into the composition including, for example, aminotriazine compounds, allantoin, hydrazides, polyamides, melamines, or mixtures thereof. The nitrogen-containing compound can comprise a heterocyclic compound having at least one nitrogen atom adjacent to an amino substituted carbon atom or a carbonyl group. Alternatively, the nitrogen-containing compound can comprise a melamine-modified phenol, a polyphenol, an amino acid, a nitrogen-containing phosphorus compound, an acetoacetamide compound, a pyrazole compound, a triazole compound, a hemiacetal compound, other guanamines, a hydantoin, a urea, including urea derivatives, and the like.

The nitrogen-containing compound can be a low molecular weight compound or a high molecular weight compound. Examples of low molecular weight nitrogen-containing compounds can include an aliphatic amine (e.g., monoethanolamine, diethanolamine, and tris-(hydroxymethyl)aminomethane), an aromatic amine (e.g., an aromatic secondary or tertiary amine such as o-toluidine, p-toluidine, p-phenylenediamine, o-aminobenzoic acid, p-aminobenzoic acid, ethyl o-aminobenzoate, or ethyl p-aminobenzoate), an imide compound (e.g., phthalimide, trimellitimide, and pyromellitimide), a triazole compound (e.g., benzotriazole), a tetrazole compound (e.g., an amine salt of 5,5'-bitetrazole, or a metal salt thereof), an amide compound (e.g., a polycarboxylic acid amide such as malonamide or isophthaldiamide, and p-aminobenzamide), hydrazine or a derivative thereof (e.g., an aliphatic carboxylic acid hydrazide such as hydrazine, hydrazone, a carboxylic acid hydrazide (stearic hydrazide, 12-hydroxystearic hydrazide, adipic dihydrazide, sebacic dihydrazide, or dodecane diacid dihydrazide; and an aromatic carboxylic acid hydrazide such as benzoic hydrazide, naphthoic hydrazide, isophthalic dihydrazide, terephthalic dihydrazide, naphthalenedicarboxylic dihydrazide, or benzenetricarboxylic trihydrazide)), a polyaminotriazine (e.g., guanamine or a derivative thereof, such as guanamine, acetoguanamine, benzoguanamine, succinoguanamine, adipoguanamine, 1,3,6-tris(3,5-diamino-2,4,6-triazinyl)hexane, phthaloguanamine or CTU-guanamine, melamine or a derivative thereof (e.g., melamine, and a condensate of melamine, such as melam, melem or melon)), a salt of a polyaminotriazine compound containing melamine and a melamine derivative with an organic acid, a salt of a polyaminotriazine compound containing melamine and a melamine derivative with an inorganic acid, uracil or a derivative thereof (e.g., uracil, and uridine), cytosine or a derivative thereof (e.g., cytosine, and cytidine), guanidine or a derivative thereof (e.g., a non-cyclic guanidine such as guanidine or cyanoguanidine; and a cyclic guanidine such as creatinine), and urea or a derivative thereof.

High molecular weight nitrogen-containing compounds can include, for example, a (co)polymer of a polyvinylamine, a (co)polymer of a polyallylamine, a condensation resin obtainable from a reaction by formaldehyde, for example, melamine resin or guanidine resin or a co-condensation resin such as a phenol-melamine resin, a benzoguanamine-melamine resin or an aromatic polyamine-melamine resin, an aromatic amine-formaldehyde resin, for example aniline resin. Polyamides can be used, including, for example, a homo- or co-polymerized polyamide such as nylon 3, nylon 4,6, nylon 6, nylon 6,6, nylon 11, nylon 12, nylon MXD6, nylon 6,10, nylon 6,11, nylon 6,12, nylon 6-6,6-6,10, or a substituted polyamide containing a methylol or alkoxymethyl group. Polyesteramides, polyamideimides, polyurethanes, poly(meth)acrylamides, copolymers of (meth)acrylamide and other vinyl-containing monomer(s), poly(vinyllactam), copolymers of vinyllactam and other vinyl-containing monomer(s), or a derivative thereof (e.g., an N-vinylformamide-N-vinylamine copolymers) (for example, trade name "PNVE Series" manufactured by Mitsubishi Chemical Corporation), copolymers of N-vinylformamide and other vinyl-containing monomer(s), poly(N-vinylcarboxylic acid amide), and copolymers of N-vinylcarboxylic acid amide and other vinyl-containing monomer(s) can also be used. The heat stabilizer can be a combination comprising at least one of any of the aforementioned nitrogen-containing compounds.

The amount of the heat stabilizer present in the polyoxymethylene composition can be 0.1 to 5 weight percent (wt. %), for example, 0.1 to 2.5 wt. %, for example, 0.2 to 1 wt. %, based on 100 wt. % of polyoxymethylene and reinforcing agent.

The polyoxymethylene composition further comprises an antioxidant. The antioxidant can be a sterically hindered phenolic compound, for example, a monocyclic hindered phenol, a polycyclic hindered phenol bonded by a hydrocarbon group or a group containing a sulfur atom, and a hindered phenol having ester group or amide group. Examples of the above compounds include 2,6-di-t-butyl-p-cresol, 2,2'-methylenebis(4-methyl-6-t-butylphenol), 4,4'-methylenebis(2,6-di-t-butylphenol), 1,1,3-tris(2-methyl-4-hydroxy-5-t-butylphenyl)butane, 4,4'-butylidenebis(3-methyl-6-t-butylphenol), 1,3-5-trimethyl-2-4,6-tris(3,5-di-t-butyl-4-hydroxybenzyl)benzene, 4,4'-thiobis(3-methyl-6-t-butylphenol), n-octadecyl-3-(4'-hydroxy-3',5'-di-t-butylphenyl)propionate, n-octadecyl-2-(4'-hydroxy-3',5'-di-t-butylphenyl)propionate, 1,6-hexanediol-bis[3-(3,5-di-t-butyl-4-hydroxphenyl)propionate], ethylenebis(oxyethylene)bis-[3-(5-tert-butyl-4-hydroxy-m-triyl) propionate], pentaerythritol tetrakis[3-(3,5-di-t-butyl-4-hydroxyphenyl)propionate], 3,9-bis[2-(3-(3-t-butyl-4-hydroxy-5-methylphenyl)-propionyloxy)-1,1-dimethylethyl]-2,4,8,10-tetraoxaspiro-[5,5]undecane, butyl-6-(3'-t-butyl-5'-methyl-2'-hydroxybenzyl)-4-methylphenylacrylate, 2-[1-(2-hydroxy-3,5-di-t-pentylphenyl)ethyl]-4,6-di-t-pentylphenylacrylate, di-n-octadecyl-3,5-di-t-butyl-4-hydroxybenzylphosphonate, N,N'-hexamethylene bis-(3,5-di-t-butyl-4-hydroxy-dihydrocinnamamide, N,N'-ethylenebis[3-(3,5-di-t-butyl-4-hydroxyphenyl)-propionamide], N,N'-tetramethylene bis [3-(3,5-di-t-butyl-4-hydroxyphenyl)-propionamide], N,N'-hexamethylenebis [3-(3,5-di-t-butyl-4-hydroxyphenyl)propionamide], N,N'-ethylenebis[3-(3-t-butyl-5-methyl-4-hydroxyphenyl)-propionamide], N,N'-hexamethylenebis-[3-(3-t-butyl-5-methyl-4-hydroxyphenyl)propionamide], N,N'-bis[3-(3,5-di-t-butyl-4-hydroxyphenyl)propionyl] hydrazine, N,N'-bis [3-(3-t-butyl-5-methyl-4-hydroxphenyl)propyonyl]-hydrazine, 1,3,5-tris(3,5-di-t-butyl-4-hydroxybenzyl) isocyanurate, 1,3,5-tris(4-t-butyl-3-hydroxy-2,6-dimethylbenzyl)-isocyanurate, triethylene glycol bis(3-tert-butyl-4-hydroxy-5-methylphenyl)propionate, and the like.

The antioxidant can comprise one of the aforementioned compounds or can be used in a combination comprising at least one of the foregoing.

The antioxidant in the composition can be present in an amount of 0.1 to 5 weight percent (wt. %), for example, 0.1 to 2.5 wt. %, for example, 0.2 to 1 wt. % based on 100 wt. % of polyoxymethylene and reinforcing agent.

In addition to the above described components, the polyoxymethylene composition can optionally further comprise additives and modifiers as are generally known and used in polyoxymethylene compositions. The additives can be mixed at a suitable time during the mixing of the components for forming the composition. The additives can be soluble and/or non-soluble in polyoxymethylene. Examples of such additives and modifiers can include UV absorbing additives, plasticizers, lubricants, antistatic agents, anti-fog agents, antimicrobial agents, colorants (e.g, a dye or pigment), surface effect additives, radiation stabilizers, flame retardants, anti-drip agents (e.g., a PTFE-encapsulated styrene-acrylonitrile copolymer (TSAN)), or a combination comprising at least one of the foregoing. The aforementioned additives can be used in amounts generally known to be effective. For example, the total amount of the additive composition (other than any impact modifier or filler) can be 0.01 to 15.0 weight percent (wt. %), or 0.01 to 10 wt. %, based on 100 wt. % of polyoxymethylene and reinforcing agent.

The polyoxymethylene compositions can be manufactured by various methods according to general techniques which are known. The polyoxymethylene compositions described herein can generally be made by melt-blending the components using any known methods. For example, polyoxymethylene, glass fibers, a heat stabilizer, an antioxidant, a (meth)acrylic polymer additive and other optional components can be first blended in a HENSCHEL-Mixer® high speed mixer. Other low shear processes, including but not limited to hand-mixing, can also accomplish this blending. The blend can then be fed into a twin-screw extruder via a hopper. Alternatively, at least one of the components can be incorporated into the composition by feeding directly into the extruder at the throat and/or downstream through a side-stuffer. Additives can also be compounded into a masterbatch containing the desired polyoxymethylene and fed into the extruder. Generally, polyoxymethylene compositions can be melt-processed at temperatures of 170 to 280° C., or 175 to 240° C., or 180 to 225° C. The extrudate can be quenched in a water bath and pelletized. The pellets so prepared can be one-fourth inch long or less as desired. Such pellets can be used for subsequent molding, shaping, or forming.

The compositions of the present disclosure can be formed into articles using any suitable techniques, for example, melt-processing techniques. Commonly used melt-molding methods can include injection molding, extrusion molding, blow molding, rotational molding, coining, and injection blow molding. For example, the melt molding method can be injection molding. The compositions of the present disclosure can be formed into sheets and both cast and blown films by extrusion. These films and sheets can be further thermoformed into articles and structures that can be oriented from the melt or at a later stage in the processing of the composition. The compositions can be over-molded onto an article made from a different material and/or by a different process. The articles can also be formed using techniques such as compression molding or ram extruding. The articles can be further formed into other shapes by machining. Exemplary articles can include gears, rods, sheets, strips, channels, tubes, conveyor system components such as wear strips, guard rails, rollers, and conveyor belt parts.

The polyoxymethylene compositions have no limitation on the utilization field thereof for molded articles. The polyoxymethylene compositions can be advantageously used in applications where enhanced physical properties including impact strength, and thermal stability are required. For example, articles comprising the polyoxymethylene composition can be used as automotive parts, electric/electronic parts, precision machine parts, building materials, piping parts, articles for daily use, cosmetic article components, and parts for medical devices. An article comprising the polyoxymethylene composition can be, for example, an automobile component, a textile machinery component, an electrical/electronic component, an information recording machine component, a molded part for medical applications, consumer goods components, or an engineering component.

The polyoxymethylene compositions can have an unnotched Izod impact strength of greater than or equal to 30 kilojoules per square meter ($kJ/m^2$), for example, greater than or equal to 50 $kJ/m^2$, for example, greater than or equal to 55 $kJ/m^2$. The polyoxymethylene compositions can have a notched Izod impact strength of greater than or equal to 8.0 $kJ/m^2$, for example, greater than or equal to 8.7 $kJ/m^2$, for example, greater than or equal to 9.5 $kJ/m^2$. Impact strength was measured according to ISO 180/2000.

The polyoxymethylene compositions can have an unnotched Charpy impact strength of greater than or equal to 50 $kJ/m^2$, for example, greater than or equal to 57 $kJ/m^2$, for example, greater than or equal to 65 $kJ/m^2$. The polyoxymethylene compositions can have a notched Charpy impact strength of greater than or equal to 8.5 $kJ/m^2$, for example, greater than or equal to 8.8 $kJ/m^2$, for example, greater than or equal to 9.5 $kJ/m^2$. Charpy impact strength was determined according to ISO 179/2000.

The polyoxymethylene compositions can have a lower dynamic coefficient of friction (COF) than a polyoxymethylene composition that is free of the (meth)acrylic polymer additive. At standard pressure/velocity conditions (e.g., pressure: 40 $lbs/inch^2$, velocity: 50 ft/min), the polyoxymethylene compositions can have a COF less than or equal to 0.5, for example, less than or equal to 0.45, for example, less than or equal to 0.4. At high pressure/velocity conditions (e.g., pressure: 80 $lbs/inch^2$, velocity: 100 ft/min), the polyoxymethylene compositions can have a COF less than or equal to 0.6, for example, less than or equal to 0.5. Dynamic coefficient of friction can be measured in a Thurst Washer type tribometer according to ASTM D3702.

The polyoxymethylene compositions can have an average tensile modulus of greater than or equal to 8.5 gigaPascals (GPa), for example, greater than or equal to 9.0 GPa. The polyoxymethylene compositions can have an average tensile strength of greater than or equal to 130 MPa, for example, greater than or equal to 135 MPa, for example, greater than or equal to 140 MPa. The polyoxymethylene compositions can have an average tensile strength of greater than or equal to 130 GPa, for example, greater than or equal to 135 GPa, for example, greater than or equal to 140 GPa. Tensile modulus and tensile strength can be measured according to ISO 527/2012.

The polyoxymethylene compositions can have an average flexural modulus of greater than or equal to 7.5 GPa, for example, greater than or equal to 7.9 GPa. The polyoxymethylene compositions can have an average flexural strength greater than or equal to 210 MPa, for example, greater than or equal to 215 MPa, for example, greater than or equal to 220 MPa. The polyoxymethylene compositions can have an average flexural strength greater than or equal to 210 GPa, for example, greater than or equal to 215 GPa, for example, greater than or equal to 220 GPa. Flexural modulus and flexural strength can be measured according to ISO 178/2010.

The polyoxymethylene compositions can have a heat deflection temperature of 160 to 170° C., for example, 160 to 165° C., for example, 162 to 164° C.

The polyoxymethylene compositions disclosed herein comprise a specific combination of polyoxymethylene and blended additives, which yields compositions having an optimized impact-modulus balance. The above-described polyoxymethylene compositions demonstrate high impact strength while maintaining good overall mechanical performance, thermal stability and tribological properties. The polyoxymethylene compositions can be used to prepare articles for a variety of applications. Therefore, a substantial improvement in polyoxymethylene compositions is provided.

EXAMPLES

The materials shown in Table 1 were used in the examples.

TABLE 1

| Component | CAS No./Description Trade name/Grade | Supplier |
|---|---|---|
| Polyoxymethylene flakes (POM) | 50-00-0 C9021 | Ticona GMBH, Germany |
| Chopped glass fiber (GF) | NEG T682 | Nippon Electric Glass, Japan |
| Antioxidant | CAS No. 6683-19-8 Irganox 1010 or Evernox 1010 | BASF, India or Everspring Chemicals Taiwan |
| Heat stabilizer | CAS No. 108-78-1 Melamine 99% | Alfa Aesar, India |
| MAA-1 | Acrylic core/acrylic shell METABLEN W-341 | Mitsubishi Rayon, Japan |
| MAA-2 | Acrylic core/silicone shell METABLEN SRK200 | Mitsubishi Rayon, Japan |
| MAA-3 | Methacrylate shell/styrene core Paraloid ™ EXL-2330 | Dow Chemicals, USA |
| MAA-4 | Methacrylate shell/butadiene-styrene core Clearstrength ® E920 | Arkema, India |
| MAA-5 | Polymethylmethacrylate EG920 | LG Chem Ltd., South Korea |

Sample Preparation

Compounding of the examples was carried out in a Krupp Werner & Pfleiderer ZSK2 co-rotating intermeshing 10-barrel twin screw extruder having a diameter of 25 mm and L/D ratio 40. This is a medium shear (general purpose) screw with side feeding at $6^{th}$ barrel. Polyoxymethylene, melamine, and the other components were added in main feeder, and the glass fiber was added in a side feeder (downstream) to ensure minimum breakage during compounding. The temperature was varied from 160 to 200° C. along the screw length, screw revolutions per minute (rpm) was 300, and feed rate was 8 kg/hour, and a residence time of about 42 seconds.

After compounding, specimens for tensile, flexural, impact, and HDT were injection were molded using an L&T ASWA 100T injection molding machine at 200° C., keeping the mold at room temperature for all compositions. A commercial grade of POM with similar glass fiber content (about 25 wt. %) (Ticona Hostaform C9021 GV 1/30) was also molded for comparison purpose, maintaining the same conditions and using as-received pellets, which had been subjected to drying.

Sample Testing

Physical measurements were made using the following tests and test methods, as described below.

Tensile properties were tested according to ISO 527/2012, and flexural properties were tested according to ISO 178/2010, both using a Zwick Z010 Universal Testing Machine.

Izod impact strength was measured according to ISO 180/2000 using a Zwick HIT 25P Impact Tester.

Charpy impact strength was measured according to ISO 179/2000 using a Zwick HIT 25P Impact Tester.

Heat deflection temperature (HDT) was evaluated flatwise in a Ceast instrument according to ISO 75/2004, using 120° C./hour temperature ramp and a load of 1.8 megaPascals (MPa).

Thermogravimetric analysis (TGA) was performed using a TGA Q5000 instrument, from room temperature to 800° C., at a heating rate of 20° C./minute in a nitrogen atmosphere.

Fourier transform infra-red (FTIR) analysis of POM as received, the additives, and the POM-additive compositions was recorded using a Perkin Elmer-GX instrument using an attenuated total reflection (ATR)-FTIR technique in which a Diamond Crystal Background was used. The resolution for each spectrum was 2 $cm^{-1}$ and was measured in a wavenumber range from 500 to 4000 $cm^{-1}$. The spectra presented were baseline corrected and reported in the transmittance mode.

Scanning electron microscopy (SEM) analysis of the samples was performed using fractured polyoxymethylene composites. The as-molded tensile specimens were cryo-fractured by immersing in liquid nitrogen for 10 minutes, followed by breaking the bars using external force. The fractured samples were mounted on SEM stubs using double-sided carbon tape with the area of interest facing up. The samples were coated with a thin layer of palladium or gold to avoid charging effects during the SEM studies. The coated sample stubs were placed in the sample chamber of an SEM (Carl Zeiss EVO 18 SE) and imaged in the SEI mode at different magnifications.

Wear testing was conducted as per ASTM D 3702, using a thrust washer apparatus Lewis LRI-1a tribometer supplied by Lewis Research Inc., USA. The counter stationary surface in the test equipment is made of carbon steel having a Rockwell C hardness of 18 to 22 and a 12 to 16 micro-inch surface finish. The applied pressure (P) and rotating speeds (V) were controlled to give different PV conditions. All the compositions were evaluated for weight loss, wear factor (K-ASTM factor) and average dynamic coefficient of friction as compared to a standard glass fiber reinforced polyoxymethylene composition.

Examples A-B and 1-6

To determine the effect of the various (meth)acrylic polymer additives on mechanical, impact, and thermal properties, polyoxymethylene-glass fiber (POM-GF) compositions were prepared using 2.5 wt. % of each modifier as shown in Table 2 (E1-E8). The properties of two comparative samples were also tested, a commercial sample, "Example A" (from Ticona, Hostaform C9021 GV 1/30, C-2) and "Example B", a standard POM-GF sample prepared without a (meth)acrylic polymer additive.

The amount of each component in Table 2 is provided in terms of weight percent, where the wt. % of the additives is based on the total weight of polyoxymethylene and reinforcing agent. The (meth)acrylic polymer additives were added over and above 100 wt. % of standard POM-GF composition. Thus, compositions B1-B5 of Table 2 total greater than 100 wt. %.

Results of mechanical, impact, and thermal property testing are also shown in Table 2.

mately equivalent. HDT of all the samples are virtually the same. All examples were also stable at a processing temperature of 200° C., showing a negligible weight loss at that temperature. Thus, the presence of the (meth)acrylic polymer additive did not change the thermal stability of the compositions.

TABLE 2

|  | Component | | | | | | |
| --- | --- | --- | --- | --- | --- | --- | --- |
|  | A | B | 1 | 2 | 3 | 4 | 5 |
| POM |  | 75 | 75 | 75 | 75 | 75 | 75 |
| Heat stabilizer |  | 0.25 | 0.25 | 0.25 | 0.25 | 0.25 | 0.25 |
| Antioxidant |  | 0.25 | 0.25 | 0.25 | 0.25 | 0.25 | 0.25 |
| GF |  | 25 | 25 | 25 | 25 | 25 | 25 |
| MAA-1 |  |  | 2.5 |  |  |  |  |
| MAA-2 |  |  |  | 2.5 |  |  |  |
| MAA-3 |  |  |  |  | 2.5 |  |  |
| MAA-4 |  |  |  |  |  | 2.5 |  |
| MAA-5 |  |  |  |  |  |  | 2.5 |
| Ash content (wt %) | 24.8 | 25.5 | 25.2 | 25.1 | 25.5 | 24.7 | 24.9 |
| Mechanical Properties |  |  |  |  |  |  |  |
| Avg. Tensile Modulus (GPa) | 8.7 | 9.1 | 9.1 | 9.0 | 8.8 | 9.0 | 9.1 |
| Std. dev. | 0.12 | 0.05 | 0.07 | 0.03 | 0.09 | 0.12 | 0.08 |
| Avg. Tensile Strength (MPa) | 127 | 138 | 138 | 144 | 140 | 139 | 145 |
| Std. dev. | 2.2 | 0.7 | 1.1 | 1.7 | 2.9 | 3.6 | 0.9 |
| Avg. Flexural Modulus (GPa) | 7.6 | 8.1 | 8.0 | 8.1 | 8.0 | 8.1 | 8.1 |
| Std. dev. | 0.2 | 0.1 | 0.2 | 0.1 | 0.1 | 0.1 | 0.1 |
| Avg. Flexural Strength (MPa) | 190 | 208 | 212 | 229 | 221 | 219 | 228 |
| Std. dev. | 3.4 | 1.8 | 0.8 | 2.1 | 2.2 | 1.6 | 1.6 |
| Impact |  |  |  |  |  |  |  |
| ISO Unnotched Izod Impact ($kJ/m^2$) | 44.8 | 47.0 | 56.2 | 57.0 | 59.2 | 59.7 | 63.4 |
| Std. dev. | 1.4 | 2.5 | 3.9 | 3.1 | 1.0 | 5.4 | 5.3 |
| ISO Notched Izod Impact ($kJ/m^2$) | 8.0 | 8.4 | 9.0 | 9.3 | 10.0 | 9.6 | 9.1 |
| Std. dev. | 0.1 | 0.1 | 0.1 | 0.1 | 0.3 | 0.1 | 0.2 |
| ISO Un-notched Charpy Impact ($kJ/m^2$) | 51.2 | 43.8 | 62.5 | 70.6 | 64.6 | 71.0 | 68.5 |
| Std. dev. | 2.2 | 3.9 | 5.1 | 5.5 | 2.6 | 2.4 | 2.4 |
| ISO Notched Charpy Impact ($kJ/m^2$) | 7.9 | 8.3 | 9.4 | 10.0 | 10.4 | 9.8 | 9.2 |
| Std. dev. | 0.3 | 0.1 | 0.1 | 0.3 | 0.8 | 0.1 | 0.4 |
| Thermal |  |  |  |  |  |  |  |
| Avg. HDT (° C.) | 162.0 | 162.8 | 163.3 | 163.2 | 163.2 | 163.0 | 163.1 |
| Std. dev. (° C.) | 0.6 | 0.3 | 0.2 | 0.4 | 0.4 | 0.6 | 0.3 |
| T50 (temperature at 50% weight loss) (° C.) | 311 | 345 | 329 | 321 | 334 | 340 | 330 |
| Weight retained at 200° C. (%) | 99.85 | 99.86 | 99.80 | 99.84 | 99.81 | 99.79 | 99.83 |

Mechanical Properties

The data in Table 2 shows that both tensile and flexural modulus of all of Examples 1-5 and Example A are comparable to each other. Both tensile and flexural strength of all Examples B and 1-5 are approximately 10% higher than that of the commercial grade, Example A. Some Examples with a (meth)acrylic polymer additive (Examples 2-5) showed even slightly higher flexural strength than that of standard POM-GF compositions without a (meth)acrylic polymer additive.

Impact Properties. All of Examples 1-5 showed significant improvement of unnotched impact properties (≥40% for Charpy and ≥20% for Izod) as compared to both the commercial and standard POM-GF compositions (Examples A and B). Notched impact properties (both Charpy and Izod) of Examples 1-5 were also about 10% higher as compared to both the commercial and standard POM-GF compositions (Examples A and B).

Thermal Properties. The data in Table 2 further show that the thermal stability of Examples A-B and 1-5 were approximately equivalent.

ATR-FTIR Analysis

ATR-FTIR analysis of POM with no (meth)acrylic polymer additive (as received), the (meth)acrylic polymer additive alone, and a combination of POM with (meth)acrylic polymer additive (without glass fiber) were performed to determine if any chemical interaction exists between POM and additives. All of the (meth)acrylic polymer additives showed signature peaks of acrylic/acrylate functionality as expected. ATR-FTIR spectra of POM as received, MAA-1, and Example 1 without glass fibers were analyzed. ATR-FTIR spectra of POM as received, MAA-5, and Example 5 without glass fibers were analyzed.

It was observed from the spectra that peak at 1140 $cm^{-1}$, corresponding to stretching of C—O—H bond of acrylate and POM is missing in the Example 1 composition without glass fibers. This indicates a possible interaction between acrylate groups of the additive with, for example, a terminal C—OH group of POM. Similar observations were also made for the other (meth)acrylic polymer additives.

Morphology Analysis Using SEM

SEM analysis of four Examples A, B, 1 and 5 was performed. The SEMs provide an indication of interfacial adhesion between POM and GF in presence of the (meth)acrylic polymer additives. The SEM images made using material from Example A and B showed that a comparatively wider gap exists between POM and GF at the interface compared to the gap at the interface in the SEM images made using material from inventive examples 1 and 5. In addition, SEM images obtained using material from examples 1 and 5 showed that the GF surface has a higher roughness and large quantities of resin remain on the glass fibers, which indicates better adhesion with POM in presence of the (meth)acrylic polymer additives as compared to Examples A and B without the additives. All of the other (meth)acrylic polymer additives showed similar trends, indicating improved interactions between POM and GF.

Volatile Organic Compounds (VOC) Analysis

The VOC content of the POM as received, Example B, and Example 1 were analyzed for formaldehyde using head space gas chromatography (GC) (Shimadzu). About 1 gram of sample was dissolved in 5 milliliters of DMSO and heated in the headspace for 30 minutes at 60° C. The vapor was analyzed by GC for any trace of formaldehyde. None of the samples yielded any trace of formaldehyde under this test condition, or during a spiking study.

Wear Testing

Wear testing was conducted for comparative Example A (Ticona commercial sample) and Example B (POM-GF, no (meth)acrylic polymer additive), as well as Example 5 as shown in Table 2. The same counter surface type was used for each sample (Exton).

TABLE 3

| Example | | K-ASTM (weight loss) $m^3*min/m*kg*hr$ ($in^3*min/ft*lbf*hr$) | COF dynamic (rotating) | Temp. ° C. | Plastic loss g/hr |
|---|---|---|---|---|---|
| 5 | Standard | 0.130 (1125) | 0.40 | 35 | 0.00119 |
| B | PV | 0.136 (1178) | 0.75 | 53 | 0.00126 |
| A | | 0.137 (1186) | 0.49 | 42 | 0.00129 |
| 5 | High PV Wear failed | 0.377 (3259) | 0.49 | 41 | 0.01438 |
| B | Wear failed | 0.624 (5399) | 0.64 | 39 | 0.02264 |
| A | Wear failed | 0.368 (3182) | 0.46 | 59 | 0.01413 |

The results in Table 3 show that at standard pressure/velocity (PV) conditions (pressure: 276 KPa (40 lbs/inch$^2$), velocity: 15.2 m/min (50 ft/min), PV: 2000), Example 5 showed better (lower) coefficient of friction (COF) than Comparative Examples A and B under both dynamic and static conditions. The K-ASTM factor (which represents weight loss) of all three samples are comparable. Standard PV condition replicates the normal usage condition of the material.

At high PV condition (pressure: 552 KPa (80 lbs/inch$^2$), velocity: 30.5 m/min (100 ft/min), PV: 8000), all compositions failed within 15 hours. As high PV indicates extreme usage condition, POM-GF is unlikely to survive that condition unless it contains PTFE and/or carbon fiber.

Overall, presence of the (meth)acrylic polymer additive PMMA improves the COF without altering the K-ASTM factor of the POM-GF composition.

Examples 6-10

Examples 6-10 show the effect of varying the amount of the (meth)acrylic polymer additive on mechanical properties. The amount of heat stabilizer and antioxidant additives were held constant at a 1:1 ratio.

The compositions and results are shown in Table 4.

TABLE 4

| | Component | | | | | |
|---|---|---|---|---|---|---|
| | B | 6 | 7 | 8 | 9 | 10 |
| POM | 75 | 75 | 75 | 75 | 75 | 75 |
| Heat stabilizer | 0.25 | 0.25 | 0.25 | 0.25 | 0.25 | 0.25 |
| Antioxidant | 0.25 | 0.25 | 0.25 | 0.25 | 0.25 | 0.25 |
| GF | 25 | 25 | 25 | 25 | 25 | 25 |
| MAA-5 | | 2.0 | 2.5 | 3.0 | 3.5 | 4.0 |
| Mechanical Properties | | | | | | |
| Tensile Modulus (GPa) | 9.1 | 8.9 | 9.1 | 9.1 | 8.9 | 8.4 |
| Tensile Strength (MPa) | 138 | 139 | 145 | 140 | 138 | 122 |
| Flex Modulus (GPa) | 8.1 | 7.9 | 8.1 | 8.0 | 7.8 | 7.7 |
| Flex Strength (MPa) | 208 | 219 | 228 | 222 | 220 | 185 |
| ISO UNII (KJ/m$^2$) | 47.0 | 58.6 | 63.4 | 62.1 | 60.8 | 58 |

The results in Table 4 show that Example 7 (2.5% PMMA) gave the best set of results in terms of impact and tensile/flexural properties. Compositions with 2 wt. %, 3 wt. % and 3.5 wt. % PMMA (Examples 6, 8, and 9) also showed improved impact properties, without other mechanical properties being degraded significantly, as compared to Example B (without (meth)acrylic polymer additive). At 4 wt. % PMMA (Example 10), however, mechanical properties started degrading.

The polyoxymethylene compositions, articles made therefrom, and methods of manufacture are further illustrated by the following embodiments, which are non-limiting.

Embodiment 1

A polyoxymethylene composition, comprising 50 to 90 wt % of a polyoxymethylene; 10 to 50 wt % of glass fibers, wherein the weight of the polyoxymethylene and the glass fibers total 100 wt. %; and 1 to less than 4.0 wt % of a (meth)acrylic polymer additive, based on the total weight of the polyoxymethylene and the glass fibers. In another aspect of Embodiment 1, a molded sample of a polyoxymethylene composition comprises glass fibers and 1 to less than 4 wt. % of a (meth)acrylic polymer additive, wherein the sample has an average tensile modulus of 8.5 GPa or greater and an average tensile strength of 130 MPa or greater such as 130 GPa or greater, measured according to ISO 527/2012.

Embodiment 2

The polyoxymethylene composition of Embodiment 1, comprising 60 to 85 wt. % of the polyoxymethylene; 15 to 40 wt. % of the glass fibers, wherein the weight of the polyoxymethylene and the glass fibers total 100 wt. %; and 1.5 to 3.5 wt. % of a (meth)acrylic polymer additive, based on the total weight of the polyoxymethylene and the glass fibers.

Embodiment 3

The polyoxymethylene composition of any one or more of Embodiments 1 to 2, comprising 70 to 80 wt. % of a polyoxymethylene; 20 to 30 wt. % of glass fibers, wherein the weight of the polyoxymethylene and the glass fibers total 100 wt. %; and 2 to 3 wt. % of a (meth)acrylic polymer additive, based on the total weight of the polyoxymethylene and the glass fibers.

Embodiment 4

The polyoxymethylene composition of any one or more of Embodiments 1 to 3, further comprising 0.1 to 5 wt. % of a heat stabilizer, based on the total weight of the polyoxymethylene and the glass fibers.

Embodiment 5

The polyoxymethylene composition of any one or more of Embodiments 1 to 4, further comprising 0.1 to 5 wt. % of an antioxidant based on the total weight of the polyoxymethylene and the glass fibers.

Embodiment 6

The polyoxymethylene composition of any one or more of Embodiments 1 to 5, comprising 50 to 90 wt. %, preferably 60 to 85 wt. %, more preferably 70 to 80 wt. % of the polyoxymethylene; 10 to 50 wt. %, preferably 15 to 40 wt. %, more preferably 20 to 30 wt. % of the glass fibers, wherein the weight of the polyoxymethylene and the glass fibers total 100 wt. %; 1 to less than 4.0 wt. %, preferably 1.5 to 3.5 wt. %, more preferably 2 to 3 wt. % of the (meth)acrylic polymer additive; 0.1 to 5 wt. %, preferably 0.1 to 2.5 wt. %, more preferably 0.2 to 1 wt. % of a heat stabilizer; and 0.1 to 5 wt. %, preferably 0.1 to 2.5 wt. %, more preferably 0.2 to 1 wt. % of an antioxidant; wherein the amounts of the (meth)acrylic polymer additive, the heat stabilizer, and the antioxidant are based on the total weight of the polyoxymethylene and the glass fibers.

Embodiment 7

The polyoxymethylene composition of any one or more of Embodiments 1 to 6, wherein a molded sample of the composition has an unnotched Izod impact of 50 kJ/m$^2$ or greater, and a notched Izod impact of 8.7 kJ/m$^2$ or greater each measured according to ISO 180/2000.

Embodiment 8

The polyoxymethylene composition of any one or more of Embodiments 1 to 7, wherein a molded sample of the composition has an unnotched Charpy impact of 57 kJ/m$^2$ or greater, and a notched Charpy impact of 8.8 kJ/m$^2$ or greater measured according to ISO 179/2000.

Embodiment 9

The polyoxymethylene composition of any one or more of Embodiments 1 to 8, wherein a molded sample of the composition has a lower dynamic coefficient of friction than the same composition without the (meth)acrylic polymer additive, measured in Thurst Washer type tribometer according to ASTM D3702 at pressure of 276 KPa (40 lbs/inch$^2$) and a velocity of 15.2 m/min (50 ft/min).

Embodiment 10

The polyoxymethylene composition of any one or more of Embodiments 1 to 9, wherein a molded sample of the composition has an average tensile modulus of 8.5 GPa or greater and an average tensile strength of 130 MPa or greater such as 130 GPa or greater, measured according to ISO 527/2012.

Embodiment 11

The polyoxymethylene composition of any one or more of Embodiments 1 to 10, wherein a molded sample of the composition has an average flexural modulus of 7.9 GPa or greater, and an average flexural strength of 210 MPa or greater such as 210 GPa or greater, measured according to ISO 178/2010.

Embodiment 12

The polyoxymethylene composition of any one or more of Embodiments 1 to 11, wherein a molded sample of the composition has a heat deflection temperature of 160 to 165° C.

Embodiment 13

The polyoxymethylene composition of any one or more of Embodiments 1 to 12, wherein a molded sample of the composition has an average tensile modulus of 8.5 GPa or greater and an average tensile strength of 130 MPa or greater such as 130 GPa or greater, measured according to ISO 527/2012; an average flexural modulus of 7.9 GPa or greater, and an average flexural strength of 210 MPa or greater such as 210 GPa or greater, measured according to ISO 178/2010; and a heat deflection temperature of 160 to 165° C.

Embodiment 14

The polyoxymethylene composition of any one or more of Embodiments 1 to 13, wherein the polyoxymethylene comprises units of the formula —$CH_2O$— and units of the formula —$(CH_2O)_p$—$C_nH_{2n}O$— wherein p is 0 or 1 and n is 2 to 6.

Embodiment 15

The polyoxymethylene composition of any one or more of Embodiments 1 to 14, wherein the (meth)acrylic polymer additive is a core-shell polymer comprising a (meth)acrylic shell and an elastomer core, a poly(methyl)methacrylate, or a combination comprising at least one of the foregoing.

Embodiment 16

The polyoxymethylene composition of Embodiment 15, wherein the core-shell polymer comprises an acrylic core, a silicone core, a styrene core, or a butadiene-styrene core.

Embodiment 17

The polyoxymethylene composition of any one or more of Embodiments 1 to 15, wherein the (meth)acrylic polymer additive is a poly(methyl)methacrylate.

Embodiment 18

The polyoxymethylene composition any one or more of Embodiments 1 to 17, wherein the antioxidant is a sterically hindered phenolic compound, triethylene glycol bis(3-tert-butyl-4-hydroxy-5-methylphenyl)propionate, or a combination comprising at least one of the foregoing.

Embodiment 19

The polyoxymethylene composition of any one or more of Embodiments 1 to 18, wherein the heat stabilizer comprises a nitrogen-containing compound reactive with formaldehyde, polyamide, a metal salt of an organic carboxylic acid, a metal oxide, a metal hydroxide, or a combination of a least one of the foregoing.

Embodiment 20

The polyoxymethylene composition of Embodiment 19, wherein the heat stabilizer comprises a nitrogen-containing compound comprising aminotriazine compounds, allantoin, hydrazides, polyamides, melamines, or mixtures comprising at least one of the foregoing.

Embodiment 21

The polyoxymethylene composition of Embodiment 20, wherein the heat stabilizer is melamine.

Embodiment 22

The polyoxymethylene composition of any one or more of Embodiments 1 to 21, further comprising a particulate filler, a particulate reinforcing agent, a plasticizer, a lubricant, a mold release agent, an antistatic agent, an anti-fog agent, an antimicrobial agent, a colorant, a surface effect additive, a radiation stabilizer, a flame retardant, an anti-drip agent, or a combination comprising at least one of the foregoing.

Embodiment 23

The polyoxymethylene composition of any one or more of Embodiments 1 to 22, wherein the particulate reinforcing agent is particulate polytetrafluoroethylene or carbon fibers.

Embodiment 24

The polyoxymethylene composition of any one or more of Embodiments 1 to 23, comprising 70 to 80 wt. % of the polyoxymethylene; 20 to 30 wt. % of the glass fibers; 0.2 to 1 wt. % of the heat stabilizer; and 0.2 to 1 wt. % of the antioxidant; wherein the heat stabilizer is a nitrogen-containing compound.

Embodiment 25

A method of manufacturing the polyoxymethylene composition of any one or more of Embodiments 1 to 28, comprising melt-combining the components of the composition; and extruding the components.

Embodiment 26

An article comprising the polyoxymethylene composition of any one or more of Embodiments 1 to 24.

Embodiment 27

The article of Embodiment 25, wherein the article is a molded article.

Embodiment 28

The article of Embodiment 25 or Embodiment 26, wherein the article is a shaped article having a heat deflection temperature determined according to ISO 75/2004 that exceeds that of a comparison standard article wherein the shaped article and the comparison standard article have the same shape and structure with the exception that the comparison standard article is prepared from a polyoxymethylene composition that does not comprise the glass fibers or the (meth)acrylic derivative.

Embodiment 29

The article of any one or more of Embodiments 25 to 27, wherein the article is an automobile component, a textile machinery component, or an engineering component.

Embodiment 30

A molded sample of a polyoxymethylene composition comprising glass fibers and 1 to less than 4 wt. % of a (meth)acrylic polymer additive, the molded sample having an average tensile modulus of 8.5 GPa or greater and an average tensile strength of 130 MPa or greater such as 130 GPa or greater, measured according to ISO 527/2012.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term. Reference throughout the specification to "one embodiment," "another embodiment," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A polyoxymethylene composition, comprising
50 to 90 wt. % of a polyoxymethylene;
10 to 50 wt. % of glass fibers, wherein the weight of the polyoxymethylene and the glass fibers total 100 wt. %; and
1 to less than 4.0 wt. % of a (meth)acrylic polymer additive, based on the total weight of the polyoxymethylene and the glass fibers;
wherein a molded sample of the composition has an unnotched Izod impact of 50 kJ/m$^2$ or greater, and a notched Izod impact of 8.7 kJ/m² or greater, each measured according to ISO 180/2000.

2. The polyoxymethylene composition of claim 1, further comprising 0.1 to 5 wt. % of a heat stabilizer, based on the total weight of the polyoxymethylene and the glass fibers.

3. The polyoxymethylene composition of claim 1, further comprising 0.1 to 5 wt. % of an antioxidant based on the total weight of the polyoxymethylene and the glass fibers.

4. The polyoxymethylene composition of claim 1, comprising
50 to 90 wt. % of the polyoxymethylene;
10 to 50 wt. % of the glass fibers, wherein the weight of the polyoxymethylene and the glass fibers total 100 wt. %;
1 to less than 4.0 wt. % of the (meth)acrylic polymer additive;
0.1 to 5 wt. % of a heat stabilizer; and
0.1 to 5 wt. % of an antioxidant;
wherein the amounts of the (meth)acrylic polymer additive, the heat stabilizer, and the antioxidant are based on the total weight of the polyoxymethylene and the glass fibers.

5. The polyoxymethylene composition of claim 1, wherein a molded sample of the composition has an unnotched Charpy impact of 57 kJ/m² or greater, and a notched Charpy impact of 8.8 kJ/m² or greater measured according to ISO 179/2000.

6. The polyoxymethylene composition of claim 1, wherein a molded sample of the composition has a lower dynamic coefficient of friction than the same composition without the (meth)acrylic polymer additive, measured in Thurst Washer type tribometer according to ASTM D3702 at pressure of 276 KPa (40 lbs/inch) and a velocity of 15.2 m/min (50 ft/min).

7. The polyoxymethylene composition of claim 1, wherein a molded sample of the composition has an average tensile modulus of 8.5 GPa or greater and an average tensile strength of 130 MPa or greater, each measured according to ISO 527/2012.

8. The polyoxymethylene composition of claim 1, wherein a molded sample of the composition has an average flexural modulus of 7.9 GPa or greater, and an average flexural strength of 210 MPa or greater, each measured according to ISO 178/2010.

9. The polyoxymethylene composition of claim 1, wherein a molded sample of the composition has a heat deflection temperature of 160 to 165° C.

10. The polyoxymethylene composition of claim 1, wherein the polyoxymethylene comprises units of the formula —$CH_2O$— and units of the formula —$(CH_2O)_p$—$C_nH_{2n}O$— wherein p is 0 or 1 and n is 2 to 6.

11. The polyoxymethylene composition of claim 1, wherein the (meth)acrylic polymer additive is a core-shell polymer comprising a (meth)acrylic shell and an elastomer core, a poly(methyl)methacrylate, or a combination comprising at least one of the foregoing.

12. The polyoxymethylene composition of claim 11, wherein the core-shell polymer comprises an acrylic core, a silicone core, a styrene core, or a butadiene-styrene core.

13. An article comprising the polyoxymethylene composition of claim 1.

14. The polyoxymethylene composition of claim 1, comprising
60 to 85 wt. % of the polyoxymethylene;
15 to 40 wt. %, of the glass fibers, wherein the weight of the polyoxymethylene and the glass fibers total 100 wt. %;
1.5 to 3.5 wt. % of the (meth)acrylic polymer additive;
0.1 to 2.5 wt. %, of a heat stabilizer; and
0.1 to 2.5 wt. %, of an antioxidant;
wherein the amounts of the (meth)acrylic polymer additive, the heat stabilizer, and the antioxidant are based on the total weight of the polyoxymethylene and the glass fibers.

15. The polyoxymethylene composition of claim 14, wherein a molded sample of the composition has an average tensile modulus of 8.5 GPa or greater and an average tensile strength of 130 MPa or greater, each measured according to ISO 527/2012.

16. The polyoxymethylene composition of claim 15, wherein a molded sample of the composition has
an unnotched Izod impact of 50 kJ/m² or greater, and a notched Izod impact of 8.7 kJ/m² or greater, each measured according to ISO 180/2000;
an unnotched Charpy impact of 57 kJ/m² or greater, and a notched Charpy impact of 8.8 kJ/m² or greater measured according to ISO 179/2000;
a lower dynamic coefficient of friction than the same composition without the (meth)acrylic polymer additive, measured in Thurst Washer type tribometer according to ASTM D3702 at pressure of 276 KPa and a velocity of 15.2 m/min;
an average flexural modulus of 7.9 GPa or greater, and an average flexural strength of 210 MPa or greater, each measured according to ISO 178/2010; and
a heat deflection temperature of 160 to 165° C.

17. The polyoxymethylene composition of claim 1, comprising
70 to 80 wt. % of the polyoxymethylene;
20 to 30 wt. % of the glass fibers, wherein the weight of the polyoxymethylene and the glass fibers total 100 wt. %;
2 to 3 wt. % of the (meth)acrylic polymer additive;
0.2 to 1 wt. % of a heat stabilizer; and
0.2 to 1 wt. % of an antioxidant;
wherein the amounts of the (meth)acrylic polymer additive, the heat stabilizer, and the antioxidant are based on the total weight of the polyoxymethylene and the glass fibers.

18. The polyoxymethylene composition of claim 17, wherein a molded sample of the composition has an average tensile modulus of 8.5 GPa or greater and an average tensile strength of 130 MPa or greater, each measured according to ISO 527/2012.

19. The polyoxymethylene composition of claim 18, wherein a molded sample of the composition has
an unnotched Izod impact of 50 kJ/m² or greater, and a notched Izod impact of 8.7 kJ/m² or greater, each measured according to ISO 180/2000;
an unnotched Charpy impact of 57 kJ/m² or greater, and a notched Charpy impact of 8.8 kJ/m² or greater measured according to ISO 179/2000;
a lower dynamic coefficient of friction than the same composition without the (meth)acrylic polymer additive, measured in Thurst Washer type tribometer according to ASTM D3702 at pressure of 276 KPa and a velocity of 15.2 m/min;
an average flexural modulus of 7.9 GPa or greater, and an average flexural strength of 210 MPa or greater, each measured according to ISO 178/2010; and
a heat deflection temperature of 160 to 165° C.

* * * * *